United States Patent Office 2,957,365
Patented Oct. 25, 1960

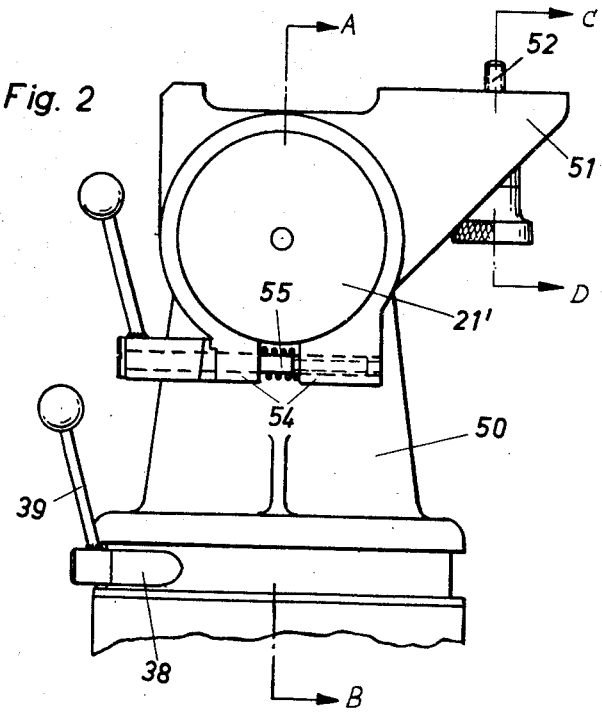
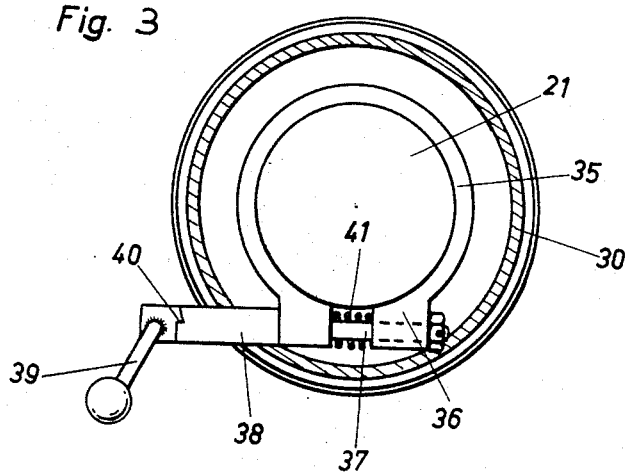

2,957,365

CAMERA PANNING HEADS

Wendelin Sachtler, 53a Eschenstrasse, Munich, Germany

Filed June 4, 1958, Ser. No. 739,814

6 Claims. (Cl. 74—572)

This invention relates to a panning head, especially a panning head mountable on a tripod, with a vertical pivoting axis and a horizontal pivoting axis, for cinematographic and television cameras.

For tripod panning heads it is known to use planet gears for the drive of movement-compensation flywheels. However the known constructions and arrangements are complicated. More especially the setting into and out of operation of the pivoting flywheels is complicated. Often there is no possibility of providing a securing arrangement for any desired camera settings.

In view of this, it is the task of the present invention to provide a tripod panning head provided with a movement-compensation flywheel, which ensures the setting into and out of operation in the most simple manner.

In order to solve this problem the invention provides on the pivoting axes compensation flywheels which are essentially characterised in that the flywheel gear is arranged in a housing canister which is rotatable and operatively connected with the gearing, upon which canister there acts a brake which holds the canister stationary.

In accordance with the invention the flywheel brake is constructed as a belt or shoe brake. The brake element expediently consists of an elastic clamping ring, which is operable by means of a stationarily mounted clamping lever. This clamping ring acts, according to a preferred form of embodiment, upon the outer surface of the housing canister, and brakes it on actuation of the hand lever, whereby the planet wheel gear is engaged or coupled, and is set in motion in the case of pivoting of the panning head.

The flywheel constructed in accordance with the invention is further suitable to an especial extent as a flywheel for the horizontal pivoting axis, when its housing wall at the same time forms a bearing for the rotation of the camera-carrying bracket. This bearing ring is preferably also constructed as a band brake.

A tripod panning head for hand cameras, with drive motor constructed as a handle, is shown as an example of embodiment according to the invention in the accompanying drawings, wherein:

Figure 2 shows a lateral elevation of Figure 1, represented partially,

Figure 3 shows a section along the line E—F in Figure 1, represented partially.

Figure 1:
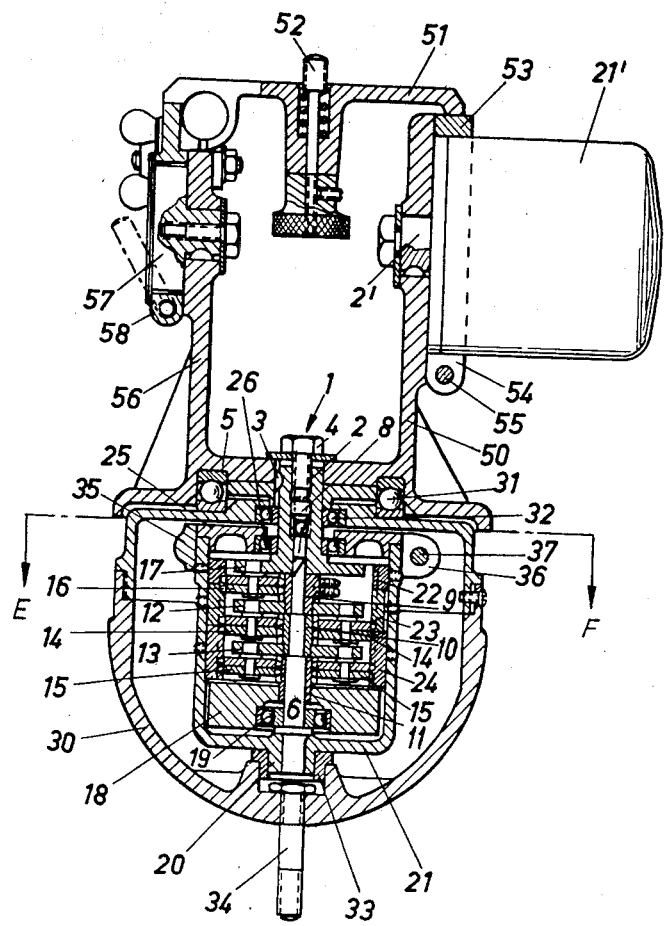
Figure 1 shows a longitudinal section along the lines A—B and C—D in Figure 2.

In the accompanying drawings, the tripod panning head as illustrated is pivotable about a vertical spindle 1. For this purpose a hollow shaft 2 is nonrotatably secured, for example by means of a key or tongue 3 and a headed screw 4, in the bottom 5 of the panning head. A flywheel spindle 6 is rotatably mounted in the hollow shaft 2. A ball 7 and an internal nut 8 serve for the clamping of the spindle with the gear assemblies mounted thereon. The flywheel spindle possesses a number of stepped portions. The internal pinions 9, 10 and 11 are mounted on these portions. The pinions 9 and 10 carry the mounting plates 12 and 13 for the planet wheel assemblies 14 and 15. Each of these assemblies consists, in the example of embodiment, of two double wheels offset by 180°. The input wheel assembly 16 running on the pinion 9 is carried by a mounting flange 17 of the hollow shaft 2. This wheel assembly consists advantageously, as a result of the greater usage, of three pairs of wheels staggered by 120°. A flywheel mass 18 is also keyed on the pinion 11, which is supported by means of a ball bearing 19 on the spindle. The spindle 6 is rotatably mounted in a hub 20 of a housing canister 21. This housing canister encloses the planet gear and carries on its internal surface the external toothed rims 22, 23, 24. These toothed rims could also be in one piece. However the division is advantageous for the avoidance of all tooth play. For this purpose springs expediently act upon the toothed rims, twisting them radially and thus clamping them mutually in the direction of rotation with the engaging toothed wheels, when tooth play is precluded. On its upper end the housing canister is closed by means of a screwed-on plate 25. This plate is supported against the hollow shaft 2 by means of a ball bearing 26 as a second flywheel bearing. The flywheel canister is finally surrounded by a hemi-spherical housing 30, having a ball bearing 31 against the bottom 5 of the panning head and a ball bearing 32 against the hollow shaft 2. The flywheel canister 21 is mounted at the lower end through a plain bearing 33 in the hemi-spherical housing. The hemi-spherical housing possesses a stud 34, by means of which the securing upon the tripod (not shown) takes place.

In accordance with the invention a brake ring 35 acts upon the housing canister 21. This brake ring consists of an elastic strip, preferably a steel grip (Figure 3), and possesses at its ends sleeves 36, into which there engages a bolt 37 mounted in a bushing 38 of the hemi-spherical housing. The bolt is operated by means of a hand lever 39, moving axially by means of a cam path 40. In this axial movement the brake ring is either contracted or released. A spiral spring 41 effects the disengagement of the brake ring. The control cam 40 is expediently so constructed that the hand lever is fixed in the end positions.

This hand brake according to the invention, which is especially suitable for the control of pivoting flywheels, can naturally also act at another point of the canister. Finally the braking of the canister can also be effected by means of another brake, for example by means of one or more brake shoes or the like.

The housing canister also renders possible the completely waterproof and dustproof closing off of the flywheel gear.

The manner of operation of the pivoting flywheel is as follows: When the panning head is turned, with its bottom 5, with the brake ring released, the panning head rotates in relation to the constantly stationary hemi-spherical housing 30, over the ball bearings 31 and 32. However the hollow shaft 2 is also moved with the panning head. As a result of the inertia and friction forces of the planet wheel gearing, which are greater than the friction forces of the canister bearings, thus the entire flywheel canister is set in motion, the gear wheels being stationary. In this case the pivoting of the panning head takes place as if without the flywheel.

However if now the brake is engaged, that is to say the canister housing is fixed in relation to the hemi-spherical housing, a rotation of the panning head is only possible by setting in motion the planet wheels. The hollow shaft 2 and the pinions 9, 10, 11 drive the gear wheel assemblies and the flywheel mass. The flywheel is in motion and renders possible a jerk-free and uniform pivoting of the camera.

The flywheel constructed in accordance with the invention is also provided on the horizontal pivoting spindle of the panning head. For this purpose the flywheel hollow shaft 2' is secured on one side wall 50 by means of the headed screw 51. The flywheel gear is similarly surrounded by a housing canister 21' which is rotatable on the hollow shaft 2'. In accordance with a further feature according to the invention this housing canister at the same time forms a bearing for a carrier bracket 51, upon which a camera can be secured by means of a stud 52. The carrier bracket possesses for this purpose a bearing ring 53 rolling on the housing canister 21'. This bearing ring is constructed in accordance with the invention as a brake ring at the same time, and is controllable by means of an axially movable bolt 55 mounted in a sleeve 54. The other bearing of the carrier bracket is constructed on the side wall 56, similarly as a plate bearing 57 with a clamping ring 58 serving for the securing of the camera in any desired picture-taking positions.

Naturally such a securing arrangement can also be provided for the vertical pivoting axis.

Since the panning head as illustrated is conceived especially for cameras with drive motor constructed as a handle, this handle motor pivoting back and forth between the side walls, the flywheel canister is attached laterally. In other panning head constructions the flywheel will expediently be arranged between the lateral walls, and the bearing ring will also be arranged within these walls. It would here also be possible to mount the carrier bracket only through one single bearing ring, made appropriately wide.

Naturally the carrier bracket could also be mounted in a different manner, for example on the hollow shaft 2', when the brake ring would be constructed as a separate element. The manner of operation of the flywheel would correspond in this case exactly to that of the vertical flywheel.

In the case as illustrated and described the manner of operation of the horizontal flywheel differs from that of the vertical spindle in that when the brake 53 is released the rotation of the carrier bracket takes place without influence of the flywheel. Only when the bearing and brake ring 53 is tightened and thus operatively connected with the housing canister 21' does the canister move according to the pivotal movement and are the planet wheels set in rotation. In this case the hollow shaft 2' is non-rotatably fixed.

The construction of a flywheel canister, in accordance with the invention, with the brake acting thereon, is not dependent upon a planet wheel flywheel. It can equally be used in the case of any other gear flywheel.

What I claim is:

1. A tripod panning head assembly for use in cinematographic and television cameras comprising panning head means pivotally mounted to vertical support means, turn compensating means including a planetary gearing and a flywheel mounted on shaft means, and operative with said support means, housing means mounted on said shaft means enclosing said turn compensating means and normally rotatable with respect thereto and operatively connected with said turn compensating means, and releasable brake means for holding said housing means stationary.

2. A tripod panning head assembly in accordance with claim 1 characterized in that the brake means includes an elastic ring clamping around the housing means and operable by means of a tensioning element.

3. A tripod panning head assembly in accordance with claim 1 characterized in that the housing means is arranged coaxially within second housing means.

4. A tripod panning head assembly in accordance with claim 1 characterized in that the second housing means and the first housing means are rotatably arranged on a common hollow shaft secured to said panning head means.

5. A tripod panning head assembly in accordance with claim 1 characterized in that the turn compensating means are mounted on a horizontal pivoting axis.

6. A tripod panning head assembly in accordance with claim 1 characterized in that the turn compensating means are mounted on a vertical pivoting axis.

References Cited in the file of this patent
UNITED STATES PATENTS

| | | |
|---|---|---|
| 554,577 | Brinck | Feb. 11, 1896 |
| 1,776,555 | Garbutt et al. | Feb. 23, 1930 |